(12) United States Patent
Hayakawa et al.

(10) Patent No.: US 11,156,308 B2
(45) Date of Patent: Oct. 26, 2021

(54) ELECTROMAGNETIC VALVE

(71) Applicant: ADVICS CO., LTD., Kariya (JP)

(72) Inventors: Hidenori Hayakawa, Anjo (JP); Kazuyuki Kobayashi, Anjo (JP)

(73) Assignee: ADVICS CO., LTD., Kariya (JP)

( * ) Notice: Subject to any disclaimer, the term of this patent is extended or adjusted under 35 U.S.C. 154(b) by 371 days.

(21) Appl. No.: 16/344,655

(22) PCT Filed: Oct. 25, 2017

(86) PCT No.: PCT/JP2017/038490
§ 371 (c)(1),
(2) Date: Apr. 24, 2019

(87) PCT Pub. No.: WO2018/079591
PCT Pub. Date: May 3, 2018

(65) Prior Publication Data
US 2020/0056719 A1 Feb. 20, 2020

(30) Foreign Application Priority Data
Oct. 25, 2016 (JP) .............................. JP2016-209019

(51) Int. Cl.
*F16K 31/06* (2006.01)
*F16K 31/10* (2006.01)
(Continued)

(52) U.S. Cl.
CPC ................ *F16K 31/10* (2013.01); *F16K 1/38* (2013.01); *F16K 31/0655* (2013.01);
(Continued)

(58) Field of Classification Search
CPC .. F16K 31/0655; F16K 31/0665; F16K 31/10; B60T 8/363; B60T 8/367
See application file for complete search history.

(56) References Cited

U.S. PATENT DOCUMENTS 5,984,261 A * 11/1999 Akita ...................... B60T 8/363
251/118
8,500,086 B2 * 8/2013 Kratzer ................... B60T 8/363
251/129.02
(Continued)

FOREIGN PATENT DOCUMENTS

JP 2009-121504 A 6/2009

OTHER PUBLICATIONS

International Search Report dated Jan. 23, 2018 in PCT/JP2017/038490 filed Oct. 25, 2017.

*Primary Examiner* — Matthew W Jellett
(74) *Attorney, Agent, or Firm* — Oblon, McClelland, Maier & Neustadt, L.L.P.

(57) ABSTRACT

An electromagnetic valve comprises a valve body having a dividing wall which separates a first chamber and a second chamber and a through-hole formed in the dividing wall and in which a valving element is inserted, a guide member having a main body portion disposed between an outer peripheral surface of the valving element and an inner peripheral surface of the valving element and forming a gap with the inner peripheral surface of the through-hole, an insertion hole through which the valving element is inserted and which slides against the outer peripheral surface of the valving element, a flange portion provided on an one-end side of the main body portion and being in contact with the dividing wall and a tapered portion provided in the one-end side and disposed inside the first chamber. The flange portion is pushed toward the dividing wall by a pushing member.

8 Claims, 12 Drawing Sheets

(51) Int. Cl.
*F16K 1/38* (2006.01)
*F16K 27/02* (2006.01)
*B60T 8/36* (2006.01)

(52) U.S. Cl.
CPC .......... *F16K 31/0665* (2013.01); *B60T 8/363* (2013.01); *B60T 8/367* (2013.01); *F16K 27/029* (2013.01)

(56) References Cited

U.S. PATENT DOCUMENTS 8,678,341 B2 * 3/2014 Watanabe .......... F16K 31/0693
251/50
9,714,721 B2 * 7/2017 Nanahara ............. B60T 13/686

* cited by examiner

ELECTROMAGNETIC VALVE

TECHNICAL FIELD

The present invention relates to an electromagnetic valve.

BACKGROUND ART

In the related art, for example, an electromagnetic valve disclosed in Patent Literature 1 below is known. In the electromagnetic valve in the related art, a guide portion for guiding a protruding portion provided on a plunger moving in a direction of an axis line is provided with respect to a valve seat. In addition, in this electromagnetic valve in the related art, an outflow hole through which a fluid flowing in from an inflow hole flows out into the guide portion is provided in the guide portion. Accordingly, the guide portion guides the protruding portion when a tip portion of the protruding portion approaches or separates from a seat surface of the valve seat. In addition, the fluid flowing in when the protruding portion is separated from the seat surface flows out through the outflow hole provided in the guide portion.

CITATION LIST

Patent Literature

Patent Literature 1: JP-A-2009-121504

SUMMARY OF INVENTION

Technical Problem

In general, the fluid has a characteristic that viscosity changes depending on temperature change. For this reason, like the electromagnetic valve in the related art, in a case where the outflow hole is provided in the guide portion, since an interval between the guide portion and the protruding portion is small, for example, in a situation where the viscosity of the fluid is increasing at low temperature, there is a possibility that necessary flow rate cannot be discharged, that is, good flow rate characteristics cannot be obtained.

In addition, in the electromagnetic valve in the related art, the guide portion provided so as not to be displaceable with respect to the valve seat guides the protruding portion in the radial direction. In this case, if an axis line of the guide portion and an axis line of the valve seat are axially displaced, there is a possibility that the valving element cannot be seated at an appropriate position of the valve seat even if the guide portion guides the protruding portion. In a case where the valving element cannot be seated at an appropriate position of the valve seat, that is, in a case where the axis line of the valving element cannot be aligned with respect to the axis line of the valve seat, there is a possibility that adequate sealing property cannot be secured.

The present invention has been made to solve the above-described problems, and an object of the present invention is to provide an electromagnetic valve that can obtain good sealing property and can align axis lines of a valving element and a valve seat.

Solution to Problem

In order to solve the above-described problems, there is provided an electromagnetic valve including a cylindrical sleeve; a cylindrical valve body fixed to one end of the sleeve; a columnar stator fixed to the other end of the sleeve; a moving part disposed to be slidable along an axis line of the sleeve between the stator and the valve body inside the sleeve; a biasing member that urges the moving part along the axis line of the sleeve; a coil that is provided on an outer periphery of the sleeve and causes the stator to generate an electromagnetic force against a biasing force generated by the biasing member with respect to at least the moving part by energization; a seat member fixed inside the valve body and having a valve seat and a valve hole; a valving element that moves along the axis line of the sleeve integrally with the moving part and seats on and separates from the valve seat of the seat member; the valve body being provided with a dividing wall that extends toward an inside of the valve body and separates a first chamber in which the seat member is provided and a second chamber in which the moving part is provided, a through-hole through which the valving element is inserted into the dividing wall, and an inflow hole through which a fluid flows into the first chamber or an outflow hole through which the fluid flows out from the first chamber, a guide member including a cylindrical main body portion disposed between an outer peripheral surface of the valving element and an inner peripheral surface of the through-hole provided in the dividing wall and having an outer diameter smaller than an inner diameter of the through-hole of the dividing wall to form a gap between the main body portion and the inner peripheral surface of the through-hole, an insertion hole which is provided in the main body portion and through which the valving element is slidably inserted, and a flange portion provided on one-end side of the main body portion, having the outer diameter larger than the inner diameter of the through-hole, and being in contact with the dividing wall; and a pushing member pushing the flange portion toward the dividing wall.

Advantageous Effects of Invention

As described above, in a case where the valving element is separated from the valve seat, the fluid flowed into the first chamber from the valve hole or the inflow hole can flow into the first chamber without passing through the guide member and can flow toward the outflow hole or the valve hole. Therefore, the fluid can flow from the valve hole toward the outflow hole or from the inflow hole toward the valve hole without being interrupted. In addition, the guide member can slidably hold the valve body inserted in the insertion hole in a state where the flange portion is pushed toward the dividing wall of the valve body by the pushing member. In addition, the guide member can have a gap formed between the outer peripheral surface of the main body portion and the inner peripheral surface of the through-hole. Accordingly, the guide member can align the axis lines of the valving element and the valve seat in a state in which the valving element is slidably inserted in the insertion hole.

By these means, it is possible to sufficiently secure the flow path cross-sectional area of the fluid flowing through the electromagnetic valve and to align axis lines of the valving element and the valve seat, so that the electromagnetic valve can make the valving element seat on the valve seat appropriately, and can exhibit good sealing property.

DESCRIPTION OF EMBODIMENTS

Figure 1:
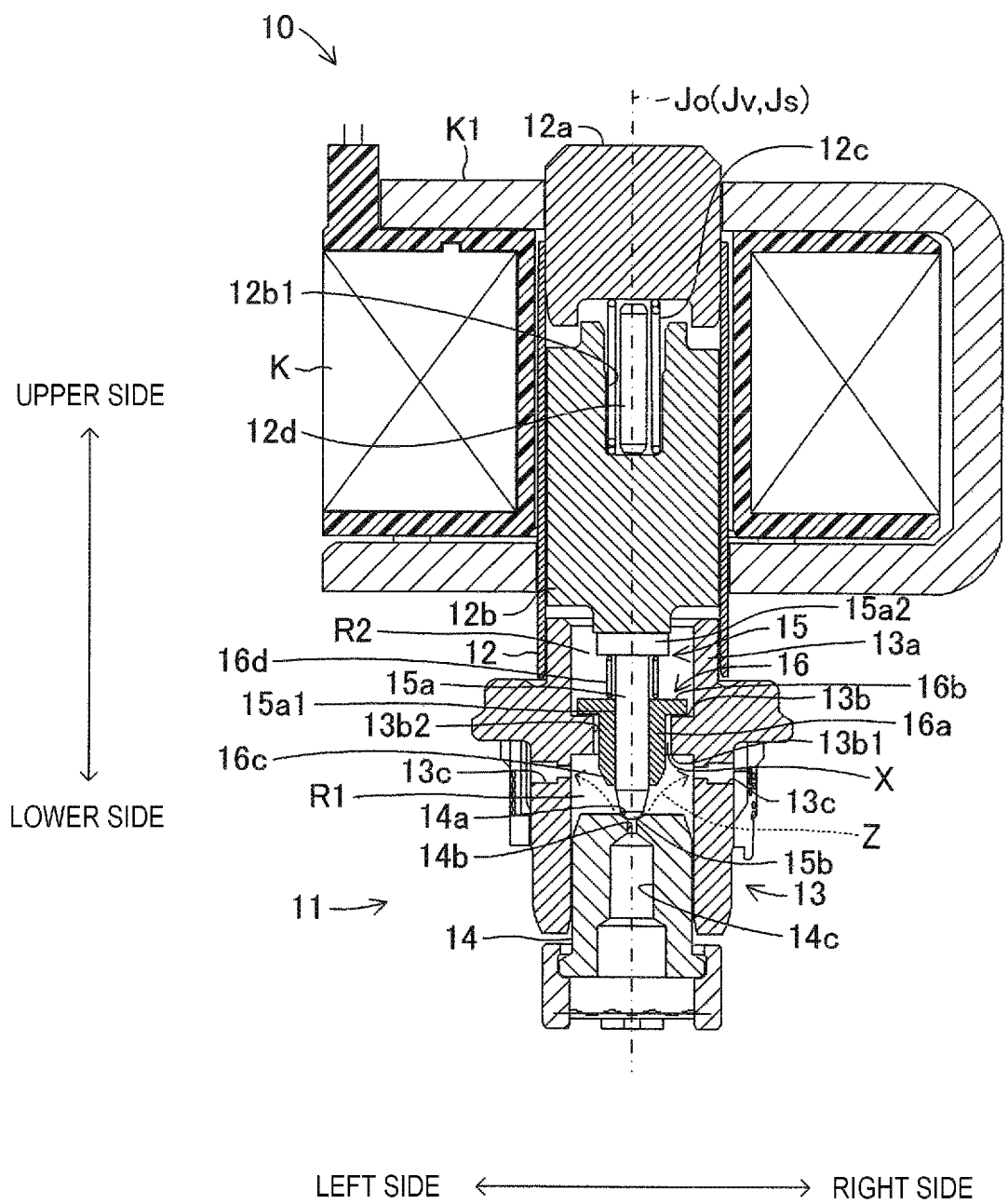
FIG. 1 is a cross-sectional diagram of an electromagnetic valve according to a first embodiment of the present invention.

Hereinafter, a first embodiment of the present invention will be described with reference to the drawings. The same reference numerals are attached to the same or equivalent parts in the following embodiments and modifications. In addition, each drawing used for explanation is a conceptual diagram, and the shape of each portion is not necessarily strict in some cases.

As shown in FIG. 1, an electromagnetic valve 10 of the first embodiment is a normally closed type electromagnetic valve that is opened at the time of energization (communication state) and closed at the time of non-energization (blocked state). The electromagnetic valve 10 includes a housing 11. The housing 11 includes a cylindrical sleeve 12 opened at both ends and a cylindrical valve body 13 liquid-tightly fixed on the one-end side (lower side in a vertical direction of FIG. 1) of the sleeve 12.

The sleeve 12 is made of a nonmagnetic material. The other end side (upper side in the vertical direction in FIG. 1) of the sleeve 12 is liquid-tightly fixed with a stator 12a. The stator 12a is made of a magnetic material in a columnar shape.

In addition, the sleeve 12 accommodates a plunger 12b therein as a moving part that is disposed between the stator 12a and the valve body 13 and slidably moves along an axis line Jo of the sleeve 12. The plunger 12b is made of a magnetic material in a columnar shape. As shown in FIG. 1, the outer diameter of the plunger 12b is formed so as to be smaller than the inner diameter of the sleeve 12, that is, to have a gap.

In addition, the sleeve 12 accommodates a spring 12c as a biasing member which is assembled between the stator 12a and the plunger 12b in a compressed state and biases the plunger 12b along the axis line Jo of the sleeve 12. More specifically, the spring 12c is accommodated inside an accommodation hole 12b1 provided on the one-end side (upper side in the vertical direction in FIG. 1) of the plunger 12b. Accordingly, the plunger 12b is biased toward the valve body 13 along the axis line Jo of the sleeve 12 by the biasing force of the spring 12c. Furthermore, the sleeve 12 accommodates a rod-like stopper member 12d which restricts movement of the plunger 12b toward the stator 12a between the stator 12a and the plunger 12b. More specifically, the stopper member 12d is accommodated in the accommodation hole 12b1 provided in the plunger 12b so as to be on the inner peripheral side of the spring 12c.

A coil K is assembled on the outer periphery of the sleeve 12. The coil K includes a yoke K1. By energizing the coil K, the stator 12a generates an electromagnetic force (suction power) against the load (biasing force) of the spring 12c which is a biasing member to the plunger 12b.

As shown in FIG. 1, the valve body 13 is made of a magnetic material in a tubular shape extending along the axis line Jo. An annular projection 13a is formed on one end (upper side in the vertical direction in FIG. 1) of the valve body 13 and inserted into one end of the sleeve 12 to be liquid-tightly fixed. A seat member 14 is liquid-tightly fixed on the other end (lower side in the vertical direction in FIG. 1) of the valve body 13. A dividing wall 13b which extends inward from an inner peripheral surface in a radial direction is formed between one end and the other end, that is, in the center part of the valve body 13. The dividing wall 13b is formed in an annular shape having a through-hole 13b1, and a guide member 16 is accommodated in the through-hole 13b1. The inner diameter of the through-hole 13b1 is larger than the outer diameter of a main body portion 16a of the guide member 16. In addition, in the center part of the valve body 13, more specifically, below (lower side in the vertical direction in FIG. 1) the dividing wall 13b, a plurality of (two places in FIG. 1) outflow holes 13c for a fluid are provided in the circumferential direction of the valve body 13. Accordingly, the valve body 13 has a passage Z that communicates an inflow hole 14c of the seat member 14 which will be described later with the plurality of outflow holes 13c.

Here, in the following description, a chamber separated by the dividing wall 13b of the valve body 13, and formed including the sleeve 12, the dividing wall 13b, and the seat member 14 below (lower side in the vertical direction in FIG. 1) the dividing wall 13b of the valve body 13 is defined as a first chamber R1. In addition, a chamber separated by the dividing wall 13b of the valve body 13, and formed including the sleeve 12, the dividing wall 13b, and the plunger 12b above (upper side in the vertical direction in FIG. 1) the dividing wall 13b of the valve body 13 is defined as a second chamber R2. The first chamber R1 and the second chamber R2 are filled with a fluid.

Figure 4:
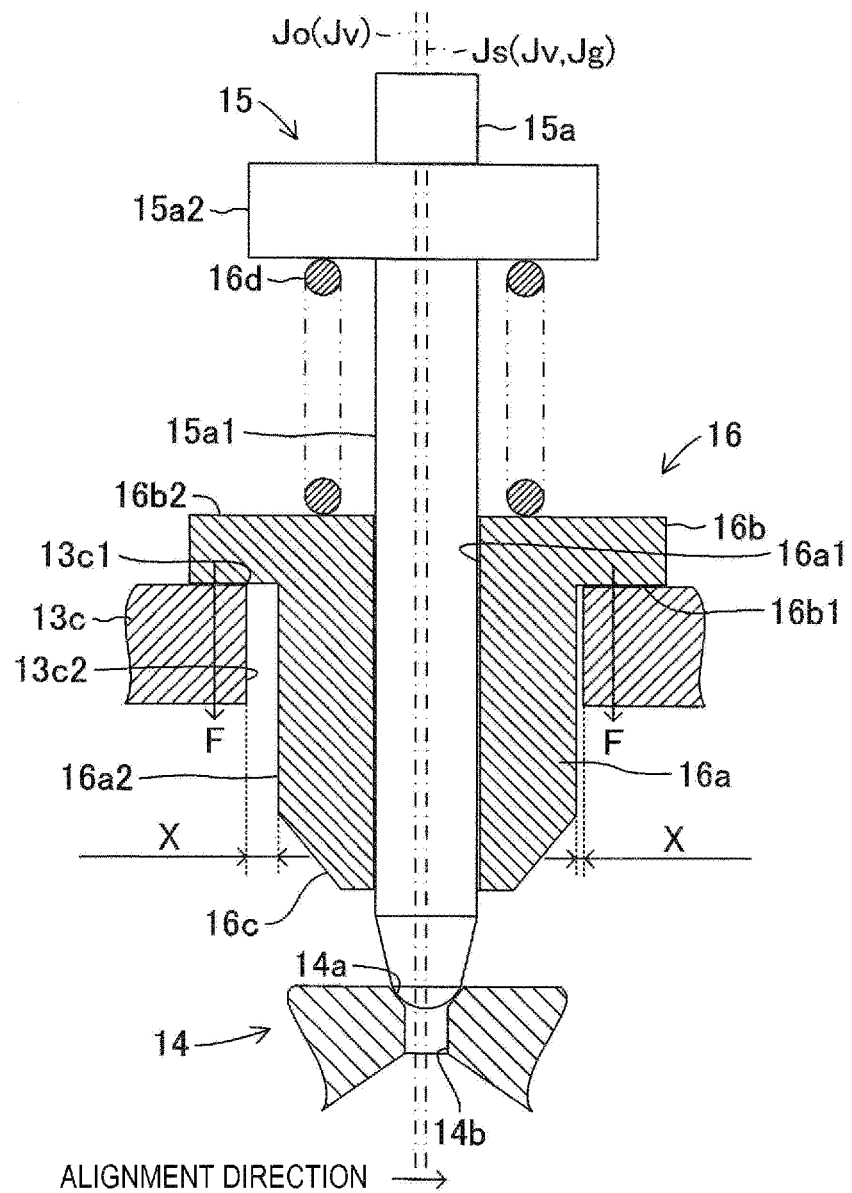
FIG. 4 is a diagram showing alignment of the guide member in FIG. 1.

The seat member 14 is made of a magnetic material in a tubular shape extending in the direction of an axis line Js (see FIG. 4). The seat member 14 has a valve seat 14a, a valve hole 14b, and the inflow hole 14c so as to be coaxial with the axis line Js. The valve seat 14a can be in contact with (seated on, separated from) a valving element 15 which moves integrally with the plunger 12b. As shown in FIG. 1, the valve seat 14a is formed in a conical shape whose cross-sectional shape along the axis line Js is recessed toward the valving element 15. Accordingly, as described later, in a case where the valving element 15 is seated on the valve seat 14a, the valving element 15 is aligned so that an axis line Jv of the valving element 15 and the axis line Js of the valve seat 14a coincide with each other.

The valve hole 14b causes the fluid flowed in from the inflow hole 14c to flow into the first chamber. The inner diameter (that is, flow path cross-sectional area) of the valve hole 14b is smaller than the flow path diameter (that is, flow path cross-sectional area) on the inflow hole 14c side. Accordingly, the valve hole 14b acts as a so-called orifice for the fluid to flow into the first chamber R1. Therefore, the electromagnetic valve 10 is capable of adjusting the flow rate of the fluid flowing into the first chamber R1 and discharged from the outflow hole 13c provided in the valve body 13.

The valving element 15 is made of a nonmagnetic material in a shaft-like shape extending in the direction of the axis line Jv (see FIG. 4), and is adapted to be inserted into the through-hole 13b1 provided in the dividing wall 13b of the valve body 13. A main body portion 15a of the valving element 15 is pressed into the valve body 13 side (lower side in the vertical direction in FIG. 1) of the plunger 12b so as to move integrally with the plunger 12b in the direction of the axis line Jo. A tip portion 15b of the valving element 15 is formed in a spherical shape, and seats on or separates from the valve seat 14a.

Figure 2:
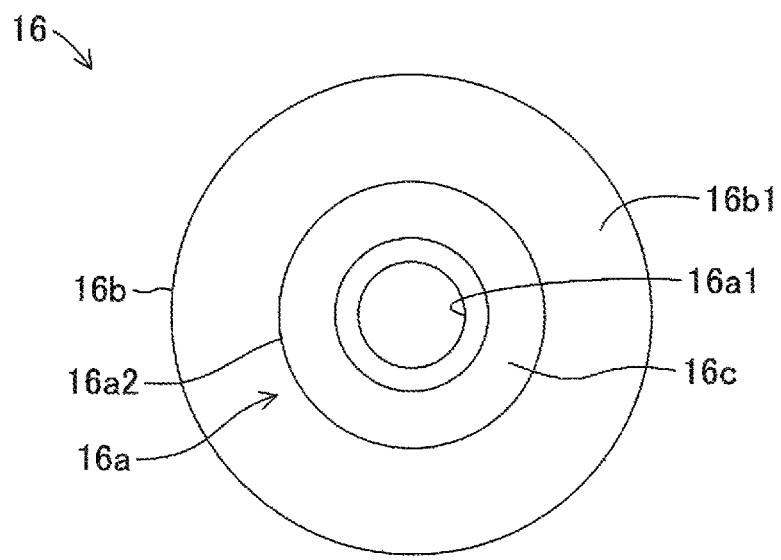
FIG. 2 is a configuration diagram of a guide member in FIG. 1.
Figure 3:
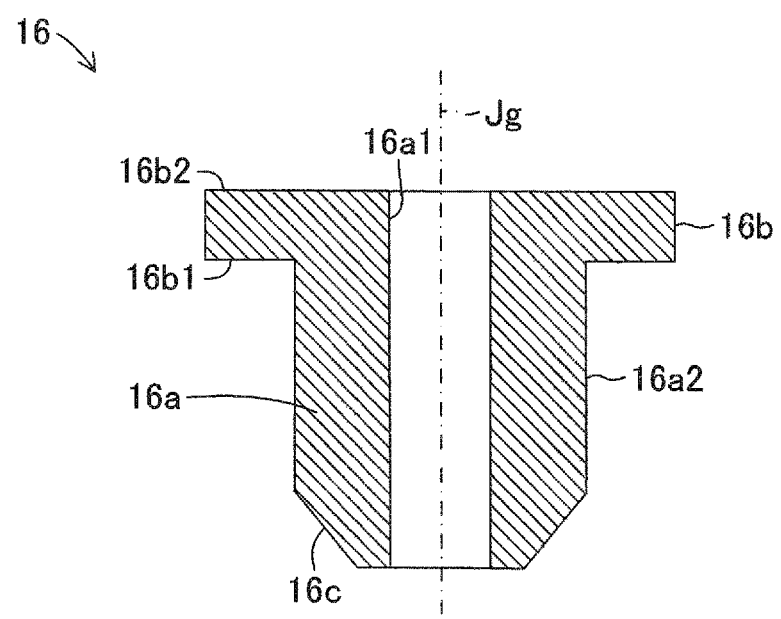
FIG. 3 is a cross-sectional diagram of the guide member in FIG. 2.

The guide member 16 is made of a magnetic material in a cylindrical shape. As shown in detail in FIGS. 2 and 3, the guide member 16 has the main body portion 16a, a flange portion 16b, and a tapered portion 16c. As shown in FIG. 3, the main body portion 16a is formed in a cylindrical shape extending in the direction of an axis line Jg. As shown in FIGS. 1 and 4, the main body portion 16a is disposed between an outer peripheral surface 15a1 of the main body portion 15a of the valving element 15 and an inner peripheral surface 13b2 of the through-hole 13b1 of the dividing wall 13b of the valve body 13. The outer diameter of the main body portion 16a is smaller than the inner diameter of the through-hole 13b1. Accordingly, as shown in FIG. 4, a gap X is formed between an outer peripheral surface 16a2 of the main body portion 16a and the inner peripheral surface 13b2 of the through-hole 13b1, and the guide member 16 is adapted to move radially inward and outward with respect to the through-hole 13b1 of the dividing wall 13b. In addition, the main body portion 16a has an insertion hole 16a1 through which the main body portion 15a of the valving element 15 is slidably inserted. The inner diameter of the insertion hole 16a1 is slightly larger than the outer diameter of the main body portion 15a of the valving element 15. Accordingly, in a case where the valving element 15 moves together with the plunger 12b, in a state where the axis line Jv and the axis line Jg coincide with each other, the valving element 15 is guided by the insertion hole 16a1 by sliding while moving relative to the guide member 16 so that the tip portion 15b seats on or separates from the valve seat 14a.

The flange portion 16b is provided on the one-end side (upper side in the vertical direction in FIG. 1) of the main body portion 16a. The outer diameter of the flange portion 16b is larger than the inner diameter of the through-hole 13b1 formed in the dividing wall 13b of the valve body 13. The flange portion 16b is in contact with the dividing wall 13b of the valve body 13 on one surface 16b1.

The tapered portion 16c is provided such that the other end side (lower side in the vertical direction in FIG. 1) of the main body portion 16a is tapered. The tapered portion 16c is located in the first chamber R1, and is formed so as to gradually decrease in diameter from the size of the outer diameter of the main body portion 16a toward a direction away from the flange portion 16b, that is, toward the valve seat 14a.

In addition, the guide member 16 is pushed toward the dividing wall 13b of the valve body 13 by a spring 16d as an elastic member constituting a pushing member. The spring 16d is provided between a large diameter portion 15a2 formed on the main body portion 15a of the valving element 15 and the other surface 16b2 of the flange portion 16b. Accordingly, a load (biasing force) of the spring 16d acts on the other surface 16b2 of the flange portion 16b. Therefore, as shown in FIG. 4, the guide member 16 is held against the dividing wall 13b in a state where one surface 16b1 of the flange portion 16b is pushed toward the dividing wall 13b of the valve body 13. The magnitude of the load (biasing force) of the spring 16d is set to be smaller than the magnitude of the load (biasing force) of the spring 12c. Accordingly, in a state where the tip portion 15b of the valving element 15 is seated on the valve seat 14a, the load (biasing force) of the spring 16d prevents the tip portion 15b of the valving element 15 from separating from the valve seat 14a.

Here, the valving element 15 is slidably inserted into the insertion hole 16a1 of the main body portion 16a. Therefore, in a situation where the fluid is discharged from the outflow hole 13c through the passage Z, even in the case where the tapered portion 16c exists in the first chamber R1, the fluid in the first chamber R1 is prevented from flowing into the second chamber R2 through the insertion hole 16a1. In addition, the flange portion 16b is biased toward the dividing wall 13b by the spring 16d. Furthermore, as shown in FIG. 1, the size of the distance between the outer peripheral surface 16a2 of the main body portion 16a and the outflow hole 13c provided in the valve body 13 is extremely larger than the size of the gap X. Therefore, in a situation where the fluid is discharged from the outflow hole 13c through the passage Z, even when the gap X is formed, the fluid in the first chamber R1 is prevented from flowing into the second chamber R2 through the gap X. By these means, the electromagnetic valve 10 can discharge the necessary flow rate from the outflow hole 13c regardless of the viscosity change of the fluid which changes depending on the temperature change.

Meanwhile, the sleeve 12, the plunger 12b, the valve body 13, the valve seat 14a provided in the seat member 14, and the valving element 15 constituting the electromagnetic valve 10 are normally manufactured separately. In this case, as shown in FIG. 4 for example, a so-called axial displacement may occur in which the axis line Jv (indicated by a two-dot chain line in FIG. 4) of the valving element 15 assembled together with the plunger 12b in the sleeve 12 of the electromagnetic valve 10 and the axis line Js (indicated by one-dot chain line in FIG. 4) of the valve seat 14a of the seat member 14 assembled to the valve body 13 do not coincide with each other.

On the other hand, as shown in FIG. 4, in the present embodiment, the gap X is formed between the outer peripheral surface 16a2 of the main body portion 16a of the guide member 16 and the inner peripheral surface 13b2 of the through-hole 13b1 provided in the dividing wall 13b. In addition, although the guide member 16 is pushed and held by the dividing wall 13b of the valve body 13 by the biasing force F of the spring 16d, it can move in the radial direction. Accordingly, even in a case where an axially displaced member is assembled, the guide member 16 can align the axis line Jv of the valving element 15 to coincide with the axis line Js of the valve seat 14a using the gap X. That is, as shown in FIG. 4, even in a case where the axis line Jv of the valving element 15 is displaced from the axis line Js of the valve seat 14a due to an axial displacement and the like, the guide member 16 moves in the radial direction so that the axis line Jv and the axis line Js coincide with each other.

Specifically, as indicated by one-dot chain line in FIG. 4, a case where the axis line Jv of the valving element 15 assembled to the sleeve 12 is displaced from the axis line Js of the valve seat 14a (a case where the axis line Jv is displaced in the leftward direction with respect to the axis line Js in FIG. 4) will be assumed. In this case, if the valving element 15 inserted into the insertion hole 16a1 of the guide member 16 cannot move in the radial direction, when the valving element 15 seats on the valve seat 14a, since the axis line Jv of the tip portion 15b of the valving element 15 is displaced from the axis line Js of the valve seat 14a, the valving element 15 cannot seat on the valve seat 14a appropriately.

On the other hand, as described above, the guide member 16 can move in the radial direction with respect to the through-hole 13b1 provided in the dividing wall 13b of the valve body 13. In addition, a gap is formed between an inner peripheral surface of the sleeve 12 and an outer peripheral surface of the plunger 12b. By these means, the guide member 16 can move the axis line Jv of the valving element 15 to a position coinciding with the axis line Js of the valve seat 14a in a state where the valving element 15 is inserted in the insertion hole 16a1. That is, the guide member 16 can move to a position where the valving element 15 appropriately seats on the valve seat 14a to be aligned.

Meanwhile, the guide member 16 is pushed and held against the dividing wall 13b of the valve body 13 by the spring 16d. Therefore, once the valving element 15 seats on the valve seat 14a, the guide member 16 is pushed and held at the seating position of the valving element 15. As described above, the guide member 16 positioned at an appropriate position (hereinafter, this position will be referred to as "proper position") can guide the valving element 15 to reliably seat on the valve seat 14a even when the valving element 15 is repeatedly seated and separated.

As can be understood from the above explanation, in the electromagnetic valve 10 of the present embodiment, the valve body 13 is provided with the dividing wall 13b that extends toward the inside of the valve body 13 and separates the first chamber R1 in which the seat member 14 is disposed and the second chamber R2 in which the plunger 12b as a moving part is disposed, the through-hole 13b1 through which the valving element 15 is inserted into the dividing wall 13b, and the outflow hole 13c through which the fluid flows out from the first chamber R1. Then, the electromagnetic valve 10 is provided with the guide member 16 that has the cylindrical main body portion 16a disposed between the outer peripheral surface 15a1 of the valving element 15 and the inner peripheral surface 13b2 of the through-hole 13b1 provided in the dividing wall 13b, having the outer diameter smaller than the inner diameter of the through-hole 13b1 of the dividing wall 13b, and having the gap X formed between the main body portion 16a and the inner peripheral surface 13b2 of the through-hole 13b1, the insertion hole 16a1 provided in the main body portion 16a and through which the valving element 15 is slidably inserted, and the flange portion 16b provided on one-end side of the main body portion 16a and having the outer diameter larger than the inner diameter of the through-hole 13b1 and being in contact with the dividing wall 13b and the spring 16d pushing the flange portion 16b of the guide member 16 toward the dividing wall 13b.

As described above, in the case were the valving element 15 is separated from the valve seat 14a, the fluid flowed into the first chamber R1 from the valve hole 14b of the seat member 14 can flow through the first chamber R1 without passing through the guide member 16 and flow toward the outflow hole 13c provided in the valve body 13. Therefore, the fluid can flow from the valve hole 14b toward the outflow hole 13c without being interrupted. In addition, the fluid flowed into the first chamber R1 from the inflow hole 14c of the seat member 14 is prevented from flowing into the second chamber R2 through the through-hole 13b1 provided in the dividing wall 13b and can flow toward the outflow hole 13c provided in the valve body 13. By these means, it is possible to sufficiently secure the flow path cross-sectional area of the fluid flowing through the electromagnetic valve 10, so that the electromagnetic valve 10 can exhibit good flow rate characteristics regardless of the viscosity change of the fluid.

Furthermore, it is possible to sufficiently secure the flow path cross-sectional area of the fluid flowing out from the plurality of outflow holes 13c by allowing the fluid to flow through the first chamber R1. For this reason, even in a case where the discharge amount of fluid is uneven between the plurality of outflow holes 13c, it is possible to prevent vibration (oscillation) caused by the valving element 15 due to the unevenness of the discharge amount. Accordingly, it is possible to prevent the tip portion 15b of the valving element 15 from unnecessarily repeatedly seating on and separating from the valve seat 14a. As a result, the electromagnetic valve 10 can exhibit good flow rate characteristics without impairing the sealing property.

In addition, the guide member 16 can guide the shaft-like valving element 15 (more specifically, the main body portion 15a of the valving element 15) by being inserted so as to slide into the insertion hole 16a1 provided in the main body portion 16a. In addition, the guide member 16 can have the gap X formed between the outer peripheral surface 16a2 of the main body portion 16a and the inner peripheral surface of the through-hole 13b1 of the dividing wall 13b. Accordingly, in the case where the axis line Jv of the valving element 15 and the axis line Js of the valve seat 14a provided in the seat member 14 are axially displaced, the guide member 16 can move the main body portion 16a in the radial direction so that the axis line Jv of the valving element 15 coincides with the axis line Js of the valve seat 14a by using the gap X. In addition, since the flange portion 16b of the guide member 16 is pushed against the dividing wall 13b by the spring 16d, the guide member 16 is held by the spring 16d at a position after moving in the radial direction of the main body portion 16a, that is, a proper position in which the axis line Jv of the valving element 15 and the axis line Js of the valve seat 14a are aligned. Accordingly, the guide member 16 can guide the valving element 15 (more specifically, the tip portion 15b of the valving element 15) that seats on or separates from the valve seat 14a at a proper position. Also by this, the tip portion 15*b* of the valving element 15 can appropriately seat on or separate from the valve seat 14*a*.

As described above, since the guide member 16 can align the axis line Jv of the valving element 15 so as to coincide with the axis line Js of the valve seat 14*a*, it is possible to prevent occurrence of wear of the tip portion 15*b* and the valve seat 14*a* even in a case where the tip portion 15*b* of the valving element 15 repeatedly seats on or separated from the valve seat 14*a*. Therefore, the electromagnetic valve 10 can maintain good sealing property for a long period of time and can exhibit good flow rate characteristics. In addition, since the flange portion 16*b* of the guide member 16 is held (fixed) against the dividing wall 13*b* of the valve body 13, in the situation where seating or separating is repeated, for example, the guide member 16 can suppress radial vibration (oscillation) generated in the valving element 15 due to the flow of the fluid. As a result, the electromagnetic valve 10 can maintain a good sealing property for a long period of time and can exhibit good flow rate characteristics.

In addition, in this case, the tapered portion 16*c* provided on the other end side of the main body portion 16*a* of the guide member 16 is provided in the first chamber R1 in a direction away from the flange portion 16*b* and having a shape (tapered shape) in which the outer diameter of the main body portion 16*a* decreases toward the valve seat 14*a*, and the flange portion 16*b* and the spring 16*d* are provided in the second chamber R2.

The fluid flows into the first chamber R1 from the inflow hole 14*c* of the seat member 14 through the valve hole 14*b* and the valve seat 14*a* and is discharged from the outflow hole 13*c* to the outside of the electromagnetic valve 10 through the passage Z. With respect to such a fluid, the tapered portion 16*c* of the guide member 16 existing in the first chamber R1 is provided in a wedge shape with respect to the flowing direction of the fluid, so that it does not interrupt (disturb) the flow of the fluid from the valve hole 14*b* (valve seat 14*a*) toward the outflow hole 13*c*. In addition, since the flange portion 16*b* and the spring 16*d* are provided in the second chamber R2, they do not interrupt (disturb) the flow of the fluid from the valve hole 14*b* (valve seat 14*a*) toward the outflow hole 13*c*. That is, the tapered portion 16*c*, the flange portion 16*b*, and the spring 16*d* do not become the flow path resistance against the flow of fluid. As a result, it is possible to secure good flow rate characteristics in a wide temperature range regardless of the viscosity change of the fluid which changes depending on the temperature, and it is possible to make the fluid discharged from the outflow hole 13*c* smoothly and efficiently flow through the first chamber R1.

In addition, since the tapered portion 16*c* does not interrupt the flow of the fluid, it is possible to bring the tapered portion 16*c* close to the valve seat 14*a* (that is, the valve hole 14*b*) of the seat member 14. Accordingly, it is possible to improve the aligning function and the guiding function of the valving element 15 by the guide member 16.

Furthermore, by having the tapered portion 16*c* in the first chamber R1, the force (fluid force) pushing the guide member 16 in the direction of the second chamber R2 (in the direction of the plunger 12*b*) can be reduced by the pressure of the fluid. Accordingly, it is possible to prevent the guide member 16 from moving in the direction of the axis line Jv (or the axis line Js) against the spring 16*d*, and it is possible to appropriately separate the first chamber R1 and the second chamber R2 by the dividing wall 13*b* and the flange portion 16*b* of the guide member 16. As a result, it is possible to prevent the fluid from flowing from the first chamber R1 to the second chamber R2 and to reliably discharge the fluid from the outflow hole 13*c*. Therefore, the electromagnetic valve 10 can exhibit good flow rate characteristics.

Second Embodiment

In the first embodiment, the valving element 15 is pressed into the plunger 12*b* in advance so that the integrated plunger 12*b* and the valving element 15 are assembled to the sleeve 12 and the valving element 15 is assembled to the valve body 13 and the guide member 16. Instead of integrating the plunger 12*b* and the valving element 15 in advance as described above, as shown in FIGS. 5 and 6, the plunger 12*b* and the valving element 15 can be separated and joined so that the plunger 12*b* is assembled to the sleeve 12 side and the valving element 15 is assembled to the valve body 13 side. Hereinafter, the electromagnetic valve 10 in a case where the plunger 12*b* and the valving element 15 are separated as described above will be described. In explaining the second embodiment, the same reference numerals are assigned to the same parts as those of the first embodiment, and the description thereof will be omitted.

Figure 5:
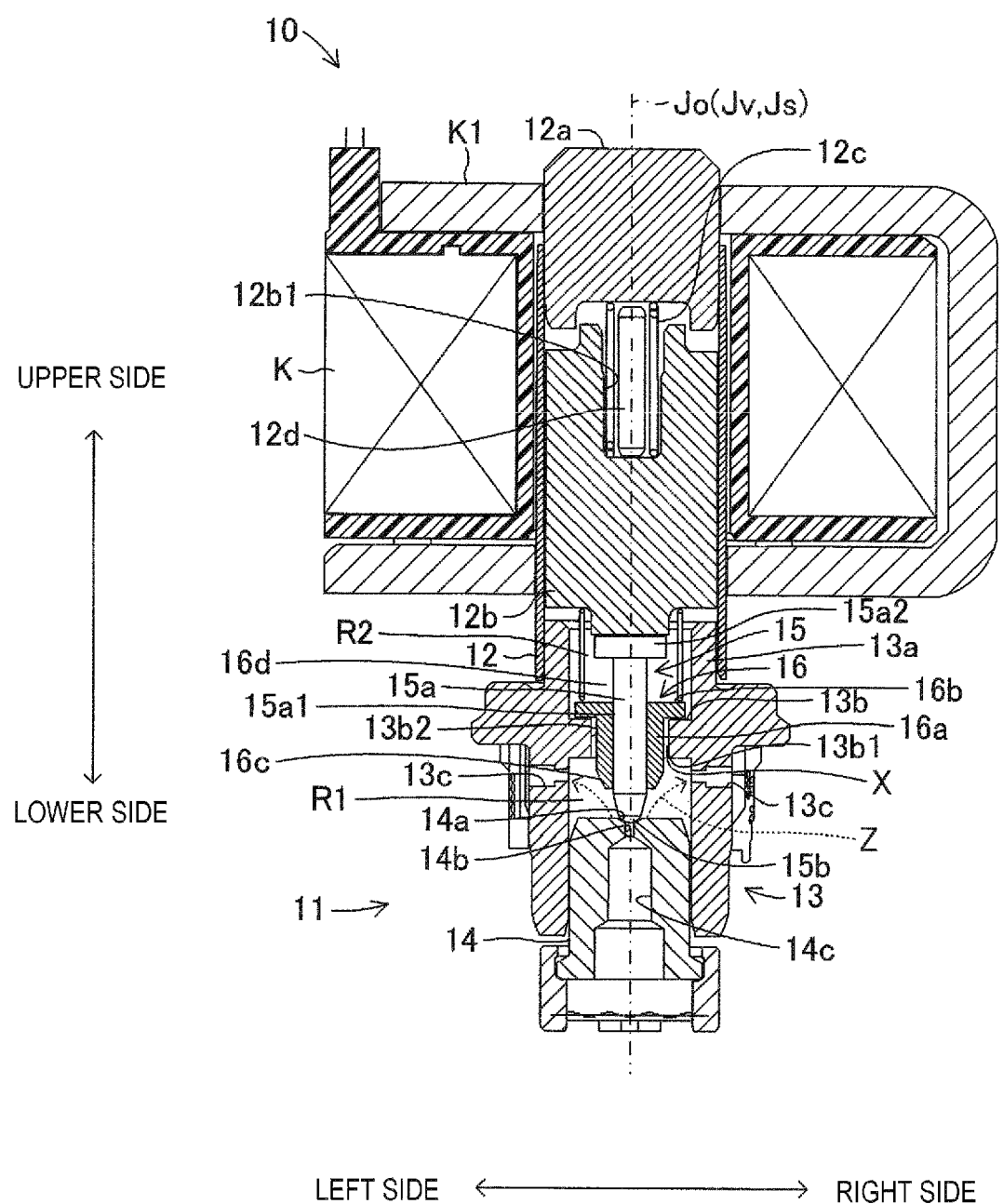
FIG. 5 is a cross-sectional diagram of an electromagnetic valve according to a second embodiment of the present invention.

In the second embodiment, as shown in FIG. 5, the large diameter portion 15*a*2 formed on the main body portion 15*a* of the valving element 15 comes in contact with the other end side (lower side in the vertical direction in FIG. 5) of the plunger 12*b*. Then, when the sleeve 12 and the valve body 13 are integrally assembled, the other end side of the plunger 12*b* and the large diameter portion 15*a*2 are joined together.

Figure 6:
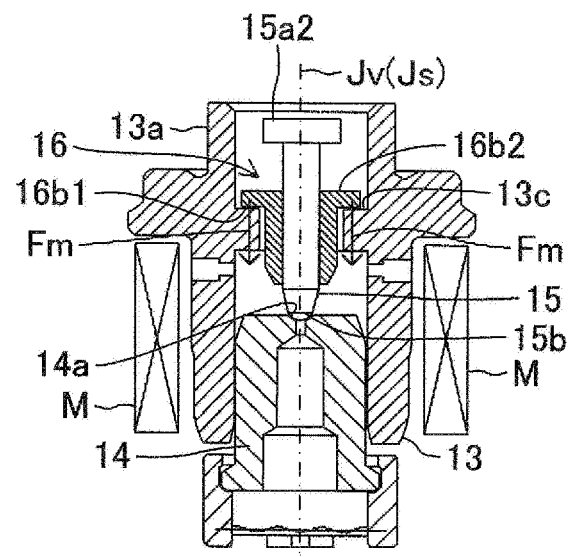
FIG. 6 is a cross-sectional diagram of an assembled state of the electromagnetic valve in FIG. 5.

In the second embodiment, as shown in FIG. 6, first, the guide member 16 is assembled in the through-hole 13*b*1 provided in the dividing wall 13*b* of the valve body 13. As shown in FIG. 6, when assembling the guide member 16, a coil M provided so as to be positioned on the outer peripheral side of the valve body 13 is energized by an assembling tool (not shown) for supporting the valve body 13. The energized coil M magnetizes the valve body 13 made of a magnetic material. Accordingly, the flange portion 16*b* of the guide member 16 which is made of a magnetic material and inserted through the through-hole 13*b*1 is attracted by a suction power (electromagnetic force) Fm generated by the magnetized dividing wall 13*b*. In this manner, the guide member 16 in which the flange portion 16*b* is attracted toward the dividing wall 13*b* by the suction power Fm is held on the dividing wall 13*b* movably in the radial direction.

The valving element 15 is inserted into the insertion hole 16*a*1 of the main body portion 16*a* of the guide member 16 held by the dividing wall 13*b*. When the valving element 15 is inserted through the insertion hole 16*a*1 of the main body portion 16*a*, the tip portion 15*b* seats on the valve seat 14*a* of the seat member 14. Here, since the guide member 16 is movable in the radial direction, the valving element 15 is allowed to move in a direction in which the axis line Jv of the valving element 15 coincides with the axis line Js of the valve seat 14*a*. That is, the guide member 16 allows alignment of the valving element 15 with respect to the valve seat 14*a*.

As described above, in the state where the valving element 15 is aligned with respect to the valve seat 14*a*, as shown in FIG. 5, the spring 16*d* is disposed between the other surface 16*b*2 of the flange portion 16*b* of the guide member 16 through which the valving element 15 is inserted and the other end side (lower side in the vertical direction in FIG. 5) of the plunger 12*b*. Accordingly, in a state where the sleeve 12 is assembled to the valve body 13, the spring 16*d* pushes the guide member 16 toward the dividing wall 13*b* by the biasing force F as in the first embodiment. That is, the spring 16*d* pushes the guide member 16 toward the dividing wall 13*b* in a state where the valving element 15 is aligned with respect to the valve seat 14*a*. Accordingly, even when the energization of the coil M is blocked (even when the valve body 13 is taken out from the assembling tool), the guide member 16 is held (fixed) at a proper position where the valving element 15 is aligned by the spring 16*d*. Then, the guide member 16 guides seating and separating of the valving element 15 at a proper position.

As can be understood from the above explanation, the same effect as the first embodiment can be obtained also in the second embodiment.

Modification Example of Second Embodiment

In the second embodiment, at the time of assembling the guide member 16, the guide member 16 is held (fixed) against the dividing wall 13*b* by energizing the coil M provided in the assembling tool, and the guide member 16 is held (fixed) at a proper position by inserting the valving element 15 therethrough. Thereafter, the guide member 16 is held (fixed) at a proper position even when the energization of the coil M is blocked by the spring 16*d*.

Figure 7:
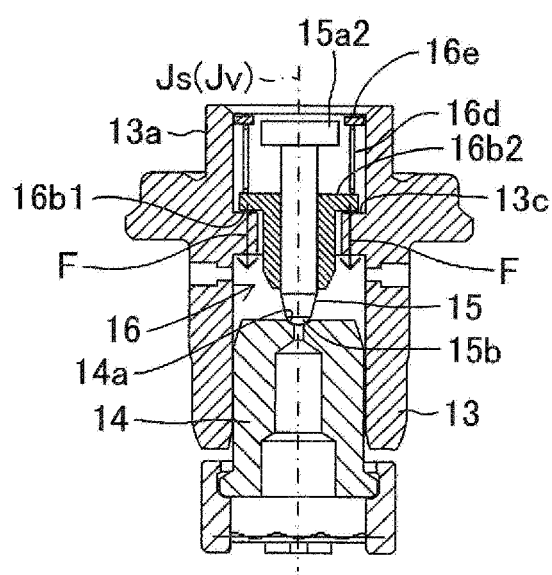
FIG. 7 is a cross-sectional diagram of an assembled state of an electromagnetic valve according to a modification example of the second embodiment.

In this case, instead of assembling the spring 16*d* after being fixed by the coil M, it is also possible to assemble the spring 16*d* to the valve body 13 as shown in FIG. 7. Specifically, first, the guide member 16 is inserted into the through-hole 13*b*1 of the dividing wall 13*b* of the valve body 13 as shown in FIG. 7. Then, with the guide member 16 being inserted through the through-hole 13*b*1, the spring 16*d* is placed on the other surface 16*b*2 of the flange portion 16*b* of the guide member 16, the spring 16*d* is in a compressed state, and an annular member 16*e* is fixed on the inner peripheral surface of the valve body 13. Accordingly, the guide member 16 is held (fixed) against the dividing wall 13*b* so as to be movable in the radial direction by the flange portion 16*b* being pushed by the biasing force F of the spring 16*d*.

In this state, the valving element 15 is inserted through the insertion hole 16*a*1 of the main body portion 16*a* of the guide member 16. When the valving element 15 is inserted through the insertion hole 16*a*1 of the main body portion 16*a*, the tip portion 15*b* seats on the valve seat 14*a* of the seat member 14. Here, since the guide member 16 is movable in the radial direction, the valving element 15 is allowed to move in a direction in which the axis line Jv of the valving element 15 coincides with the axis line Js of the valve seat 14*a*. That is, the guide member 16 allows the alignment of the valving element 15 with respect to the valve seat 14*a* in a state pushed by the spring 16*d*.

Accordingly, the guide member 16 is held (fixed) at a proper position where the valving element 15 is aligned by the spring 16*d*. Then, the guide member 16 guides seating and separating of the valving element 15 at a proper position. Therefore, also in this modification example, effects similar to those of the first embodiment and the second embodiment can be obtained.

Each Embodiment and First Modification Example of Modification Example

When the plunger 12*b* moves, a portion of the compressed fluid in the second chamber R2 may flow between the dividing wall 13*b* of the valve body 13 and the flange portion 16*b* of the guide member 16 to flow to the first chamber R1 side.

Figure 8:
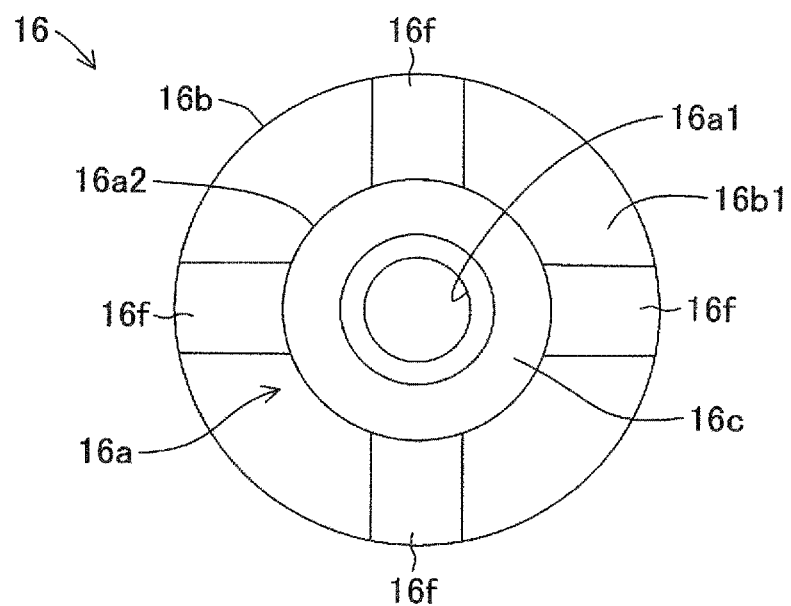
FIG. 8 is a configuration diagram of a guide member according to the first embodiment, the second embodiment, and a first modification example in the modification example of the second embodiment.
Figure 9:
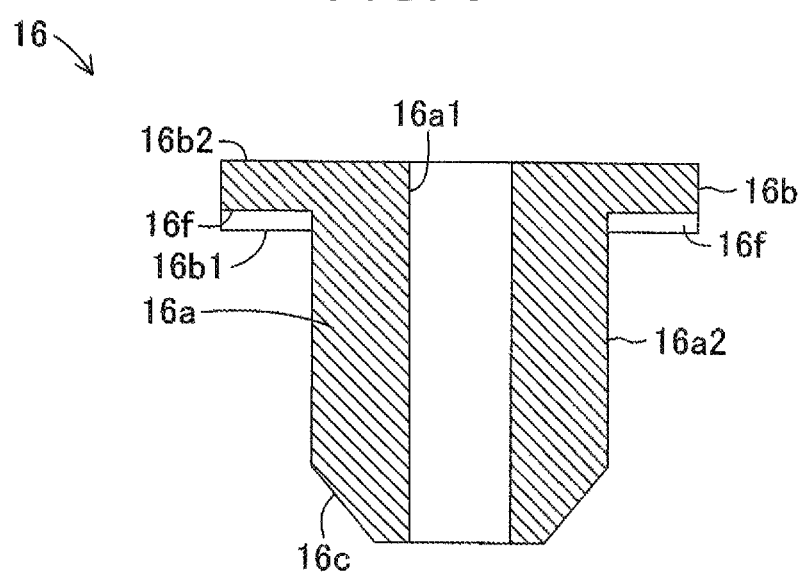
FIG. 9 is a cross-sectional diagram of the guide member in FIG. 8.

In the first modification example, as shown in FIGS. 8 and 9, a plurality (for example, four) of groove portions 16*f* extending in the radial direction are provided on one surface 16*b*1 of the flange portion 16*b* of the guide member 16. As described above, by providing the groove portion 16*f*, a flow path is formed between one surface 16*b*1 of the flange portion 16*b* of the guide member 16 and the dividing wall 13*b* of the valve body 13. Furthermore, the gap X is formed between the main body portion 16*a* of the guide member 16 and the through-hole 13*b*1 of the dividing wall 13*b* so as to allow alignment. Therefore, the groove portion 16*f* communicates the second chamber R2 with the first chamber R1, and functions as a flow path through which a portion of the fluid flows toward the first chamber R1 when the fluid in the second chamber R2 is compressed by the movement of the plunger 12*b*.

That is, in a case where the groove portion 16*f* of the guide member 16 is provided in the flange portion 16*b*, the guide member 16 has a flow path that allows the fluid compressed by the movement of the plunger 12*b* along the axis line Jo of the sleeve 12 to communicate between the second chamber R2 and the first chamber R1 via the gap X. Accordingly, in this first modification example, in a case where the fluid in the second chamber R2 is compressed as the plunger 12*b* moves, the fluid in the second chamber R2 can also flow into the first chamber R1 through the groove portion 16*f*. In other words, as the plunger 12*b* moves in the direction of the axis line Jo, the fluid easily flows out from the second chamber R2 to the first chamber R1. As a result, for example, even in a case where the resistance of the fluid is high as at low temperature, it is possible to reduce the resistance generated by the fluid when the plunger 12*b* moves, and to improve the responsiveness of the plunger 12*b* in response to the energization and non-energization of the coil K. Therefore, since the responsiveness of setting or separating of the valving element 15 also becomes better, the electromagnetic valve 10 can exhibit good flow rate characteristics.

Each Embodiment and Second Modification Example of Modification Example

Figure 10:
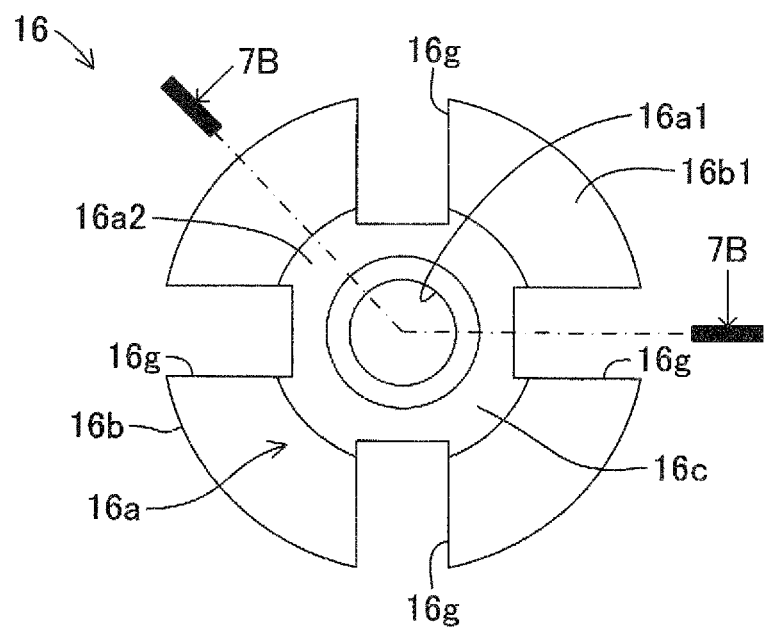
FIG. 10 is a configuration diagram of a guide member according to the first embodiment, the second embodiment, and a second modification example in the modification example of the second embodiment.
Figure 11:
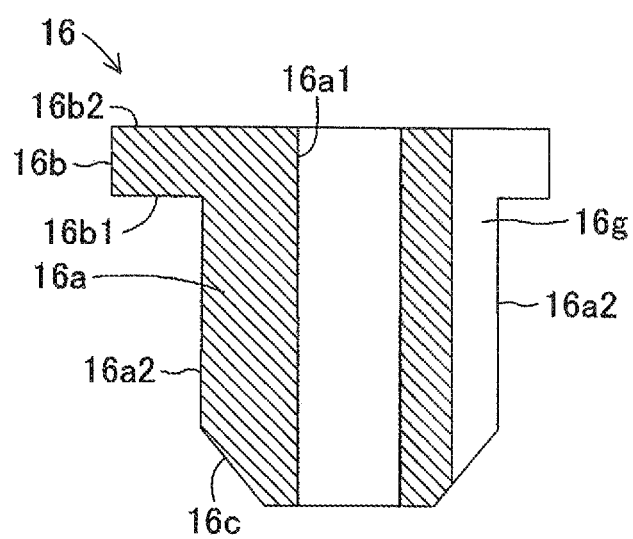
FIG. 11 is a cross-sectional diagram of the guide member in FIG. 10.

In the second modification example, as shown in FIGS. 10 and 11, a cutout portion 16*g* is provided in the flange portion 16*b* of the guide member 16. As described above, by providing the cutout portion 16*g*, the second chamber R2 and the first chamber R1 are communicated with each other between the main body portion 16*a* of the guide member 16 and the through-hole 13*b*1 of the dividing wall 13*b* via the gap X enabling the alignment. Therefore, the cutout portion 16*g* communicates the second chamber R2 with the first chamber R1 and functions as a flow path through which a fluid flows when the fluid in the second chamber R2 is compressed.

Accordingly, it is possible to obtain the same effect as in the first modification example.

In the first modification example, the groove portion 16*f* is provided in the flange portion 16*b* of the guide member 16, and in the second modification example, the cutout portion 16*g* is provided in the flange portion 16*b* of the guide member 16. In this case, it is also possible to provide a groove portion corresponding to the groove portion 16*f* in the dividing wall 13*b* of the valve body 13 or to provide a cutout portion corresponding to the cutout portion 16*g* in the dividing wall 13*b* of the valve body 13. Even in this case, effects equivalent to those of the first modification example and the second modification example can be expected.

Each Embodiment and Third Modification Example of Modification Example

Figure 12:
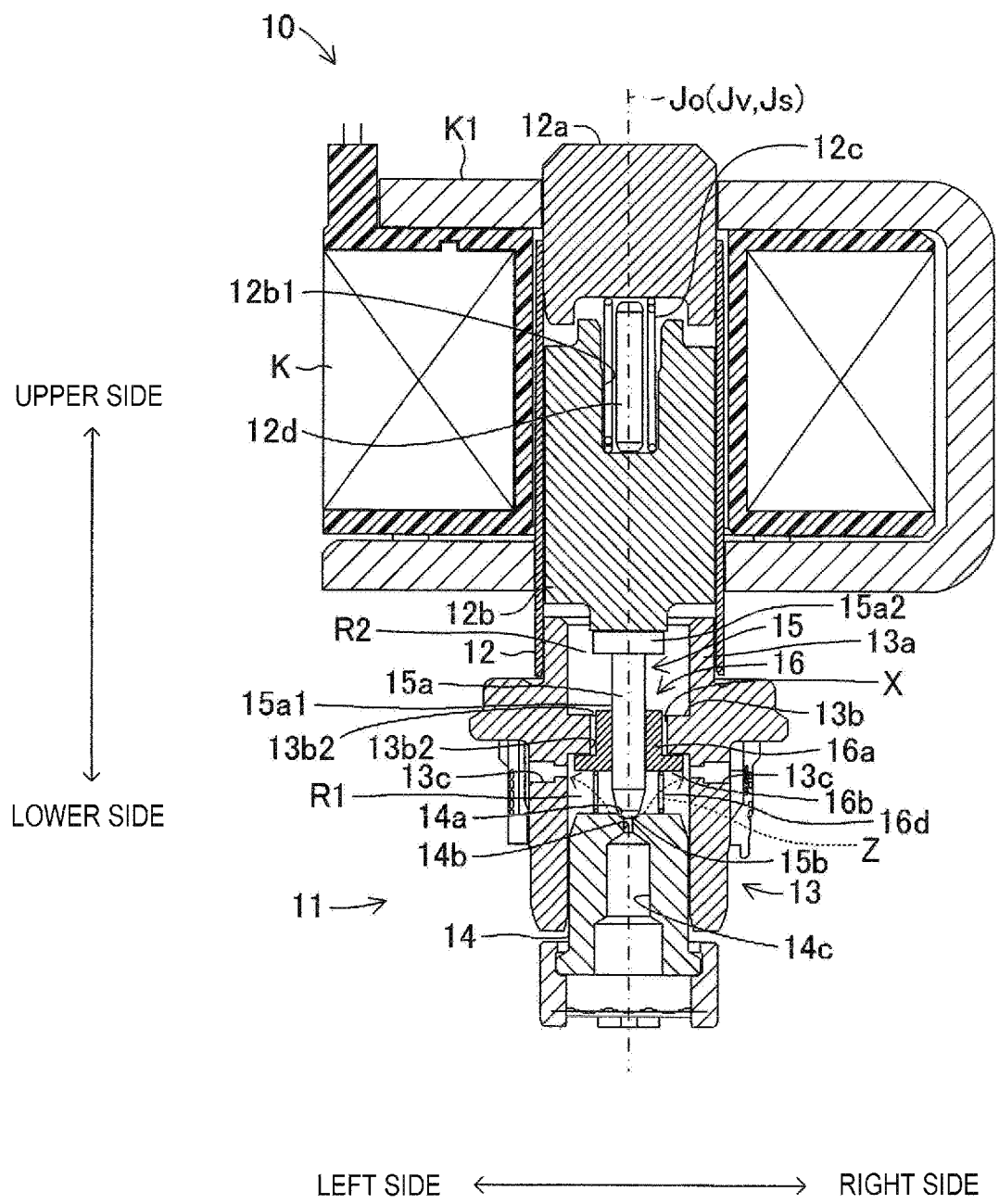
FIG. 12 is a cross-sectional diagram of a configuration of an electromagnetic valve according to the first embodiment, the second embodiment, and a third modification example in the modification example of the second embodiment.

As shown in FIG. 12, it is possible to dispose the flange portion 16*b* of the guide member 16 and the spring 16*d* in the first chamber R1. In this case, the spring 16*d* is disposed between the seat member 14 and the other surface 16*b*2 of the flange portion 16*b*.

As described above, even in a case where the flange portion 16*b* of the guide member 16 and the spring 16*d* are disposed in the first chamber R1, the guide member 16 is pushed toward the dividing wall 13*b* of the valve body 13 movably in the radial direction by the spring 16*d*. Accordingly, as the valving element 15 is inserted into the insertion hole 16*a*1 provided in the main body portion 16*a* of the guide member 16, and the tip portion 15*b* of the valving element 15 seats on the valve seat 14*a* of the seat member 14, the guide member 16 can align the valving element 15 with respect to the valve seat 14*a*. Since the guide member 16 is pushed and held (fixed) at a proper position by the spring 16*d* after alignment, the valving element 15 can be appropriately guided when seating and separating the valving element 15. Therefore, also in the third modification example, effects similar to those of each embodiment and modification examples can be obtained.

Each Embodiment and Fourth Modification Example of Modification Example

Figure 13:
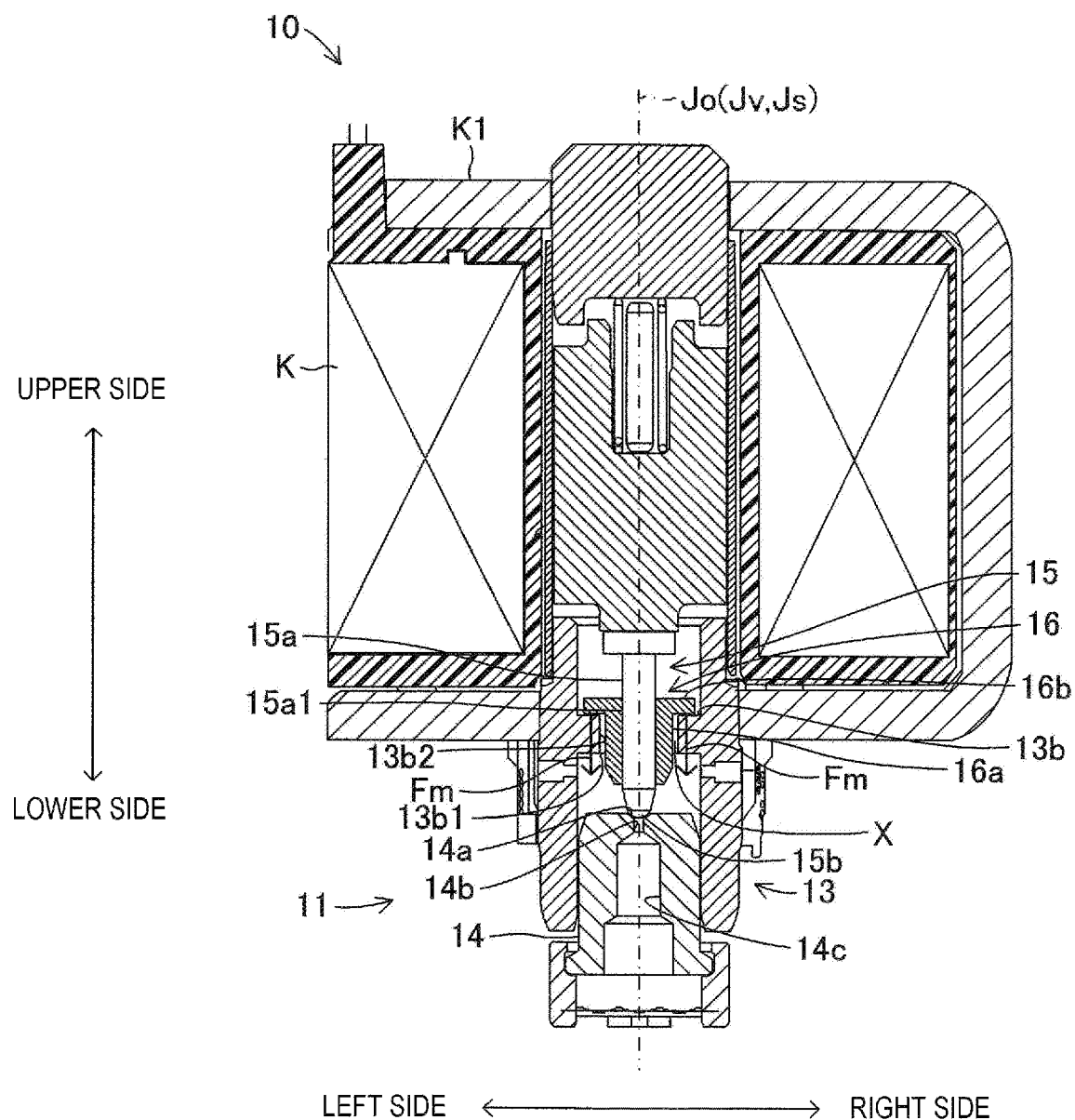
FIG. 13 is a cross-sectional diagram of a configuration of an electromagnetic valve according to the first embodiment, the second embodiment, and a fourth modification example in the modification example of the second embodiment.

In the fourth modification example, as shown in FIG. 13, the yoke K1 of the coil K extends up to the dividing wall 13*b* of the valve body 13. Accordingly, in a case where the coil K is energized, the dividing wall 13*b* of the valve body 13 made of a magnetic material is reliably magnetized, and a suction power (electromagnetic force) Fm for attracting the flange portion 16*b* of the guide member 16 is generated in the dividing wall 13*b*.

Figure 14:
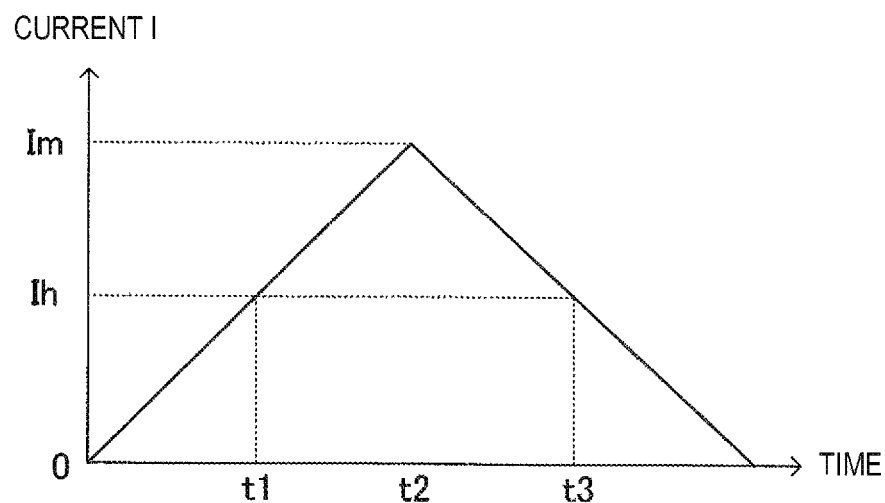
FIG. 14 is a current control diagram of the electromagnetic valve in FIG. 13.
Figure 15:
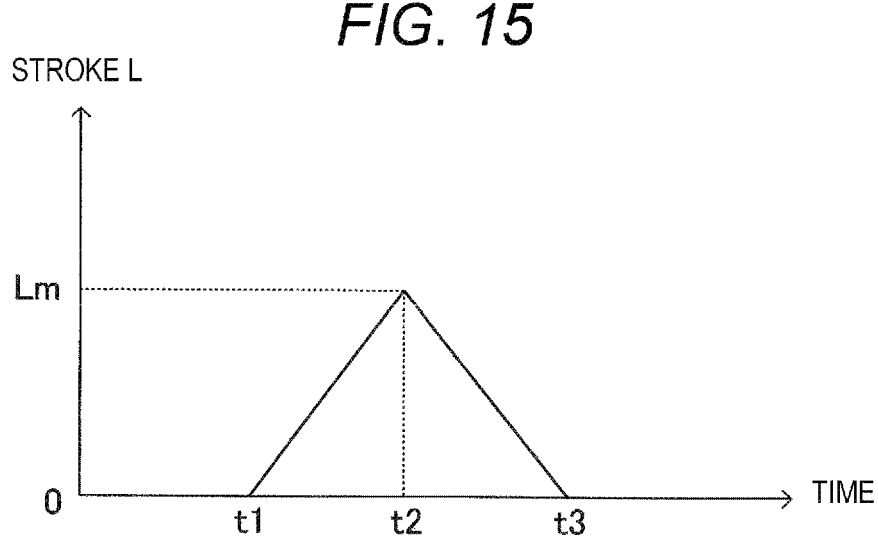
FIG. 15 is a diagram of a stroke of a valving element of the electromagnetic valve in FIG. 13 according to the current control in FIG. 14.
Figure 16:
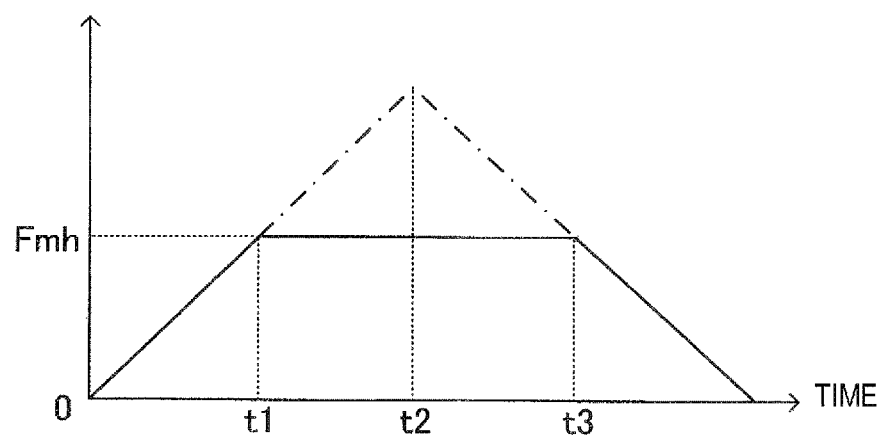
FIG. 16 is a diagram of a suction power (electromagnetic force) generated between the dividing wall and the flange portion of the electromagnetic valve in FIG. 13 according to the current control in FIG. 14.

As described above, in a case where the guide member 16 is fixed by the suction power Fm, particularly, in a state where the valving element 15 is separated from the valve seat 14*a*, it is necessary to hold (fix) the guide member 16 to the dividing wall 13*b* at a proper position. Therefore, as shown in FIG. 14, a current I is supplied to the coil K. Specifically, in a case where the electromagnetic valve 10 is switched to a valve opening state, the current I supplied to the coil K increases from zero, as shown in FIG. 14. In this case, as shown in FIG. 15, when a current Ih is supplied to the coil K at a time point t1 at which the plunger 12*b* (valving element 15) starts moving (stroke) in the separation direction, the dividing wall 13*b* of the magnetized valve body 13 generates a suction power Fmh that holds (fixes) the guide member 16 immovably in the radial direction as shown in FIG. 16. In addition, as shown in FIG. 14, from the time point t1 to a time point t2, the current I increases to a current Im, so that, as shown in FIG. 15, a stroke L of the plunger 12*b* (valving element 15) is a maximum stroke Lm. Accordingly, since the tip portion 15*b* of the valving element 15 is away from the valve seat 14*a* of the seat member 14 and separated from the valve seat 14*a*, the electromagnetic valve 10 is switched to the valve opening state. When the current I increases up to the current Im, as shown in one-dot chain line in FIG. 16, the suction power Fm becomes larger than the suction power Fmh, but the magnitude of the suction power Fmh is sufficient to hold (fix) the guide member 16.

Then, in a case where the electromagnetic valve 10 is switched to a valve closed state, as shown in FIG. 14, the current I decreases to the current Ih from the time point t2 to a time point t3. Accordingly, as shown in FIG. 15, the stroke L of the plunger 12*b* (valving element 15) becomes zero, and the tip portion 15*b* of the valving element 15 is seated while approaching the valve seat 14*a* of the seat member 14, the electromagnetic valve 10 is switched to the valve closed state. At the time point t3, since the current Ih is supplied to the coil K, as shown in FIG. 16, the dividing wall 13*b* of the valve body 13 is magnetized to generate the suction power Fmh. Therefore, since the guide member 16 is held (fixed) at a proper position with respect to the dividing wall 13*b* until the tip portion 15*b* of the valving element 15 approaches and seats on the valve seat 14*a*, the guide member 16 appropriately guides the valving element 15 to the valve seat 14*a*. After the time point t3, since the tip portion 15*b* of the valving element 15 is seated on the valve seat 14*a*, as shown in FIG. 14, the current I supplied to the coil K decreases to zero. As described above, as the current I supplied to the coil K decreases, as shown in FIG. 16, the suction power Fm generated by the dividing wall 13*b* also decreases to zero.

Here, after the time point t3, in a case where the electromagnetic valve 10 is a normally closed type electromagnetic valve, the valve seat 14*a* is seated on the tip portion 15*b* of the valving element 15, so that the suction power Fmh is unnecessary. However, in a case where the guide member 16 needs to be held (pushed) by the dividing wall 13*b* in order to prevent the guide member 16 from moving along the axis line Js (axis line Jv) and moving in the radial direction, for example, the current Ih is supplied to the coil K. Accordingly, the guide member 16 is always attracted (pushed) to the dividing wall 13*b* by the suction power Fmh and held at a proper position.

From the above, in the fourth modification example, the dividing wall 13*b* is magnetized by the coil K, and it is possible to attract (push) the guide member 16 toward the dividing wall 13*b* by the suction power (electromagnetic force) Fmh generated by the dividing wall 13*b* due to magnetization. Therefore, in the fourth modification example, the coil K that generates the suction power Fmh functions as a pushing member. Also in this fourth modification example, since the guide member 16 can be pushed and held (fixed) against the dividing wall 13*b* of the valve body 13 at a proper position, the same effects as the above-described embodiments and modification examples can be obtained.

Other Modification Examples

The electromagnetic valve 10 in above-described embodiments and modification examples is a normally closed type electromagnetic valve, but it may be applied to a normally open type electromagnetic valve. In this case, the spring 12*c* is assembled in a compressed state, for example, between the other end side (lower side in the vertical direction in FIG. 1) of the plunger 12*b* and the dividing wall 13*b* of the valve body 13.

Even if the electromagnetic valve 10 is a normally open type electromagnetic valve, as the tip portion 15*b* of the valving element 15 seats on the valve seat 14*a*, the guide member 16 can align the valving element 15 with respect to the valve seat 14*a*. Then, the guide member 16 is held (fixed)

in a proper position in which the valving element 15 is aligned, and the guide member 16 can guide the valving element 15 to the valve seat 14a at a proper position. Therefore, even if the electromagnetic valve 10 is a normally open type electromagnetic valve, the same effects as the above-described embodiments and modification examples can be obtained.

Meanwhile, the electromagnetic valve 10 described in the above-described embodiments and modification examples, for example, can be applied to an electromagnetic valve constituting a brake control system of a vehicle. Hereinafter, a brake control system to which the electromagnetic valve 10 can be applied will be briefly described with reference to FIG. 17.

In the brake control system, the electromagnetic valve 10 is incorporated in an actuator 5. The brake control system includes a master cylinder (MIC) 230, master pistons 231, 232, and a master reservoir 233 as a cylinder mechanism 23. Wheel cylinders 24, 25, 26, 27 are disposed on a left rear wheel RL, a right rear wheel RR, a left front wheel FL, and a right front wheel FR, respectively to apply braking force.

In the brake control system, when a driver steps on a brake operation member 21, a stepping force is boosted by a booster 22 so that the master pistons 231, 232 inside the master cylinder 230 are pushed. Accordingly, the same master cylinder pressure is generated in a first master chamber 230a and a second master chamber 230b. The master cylinder pressure is transmitted to the wheel cylinders 24 to 27 via the actuator 5.

Figure 17:
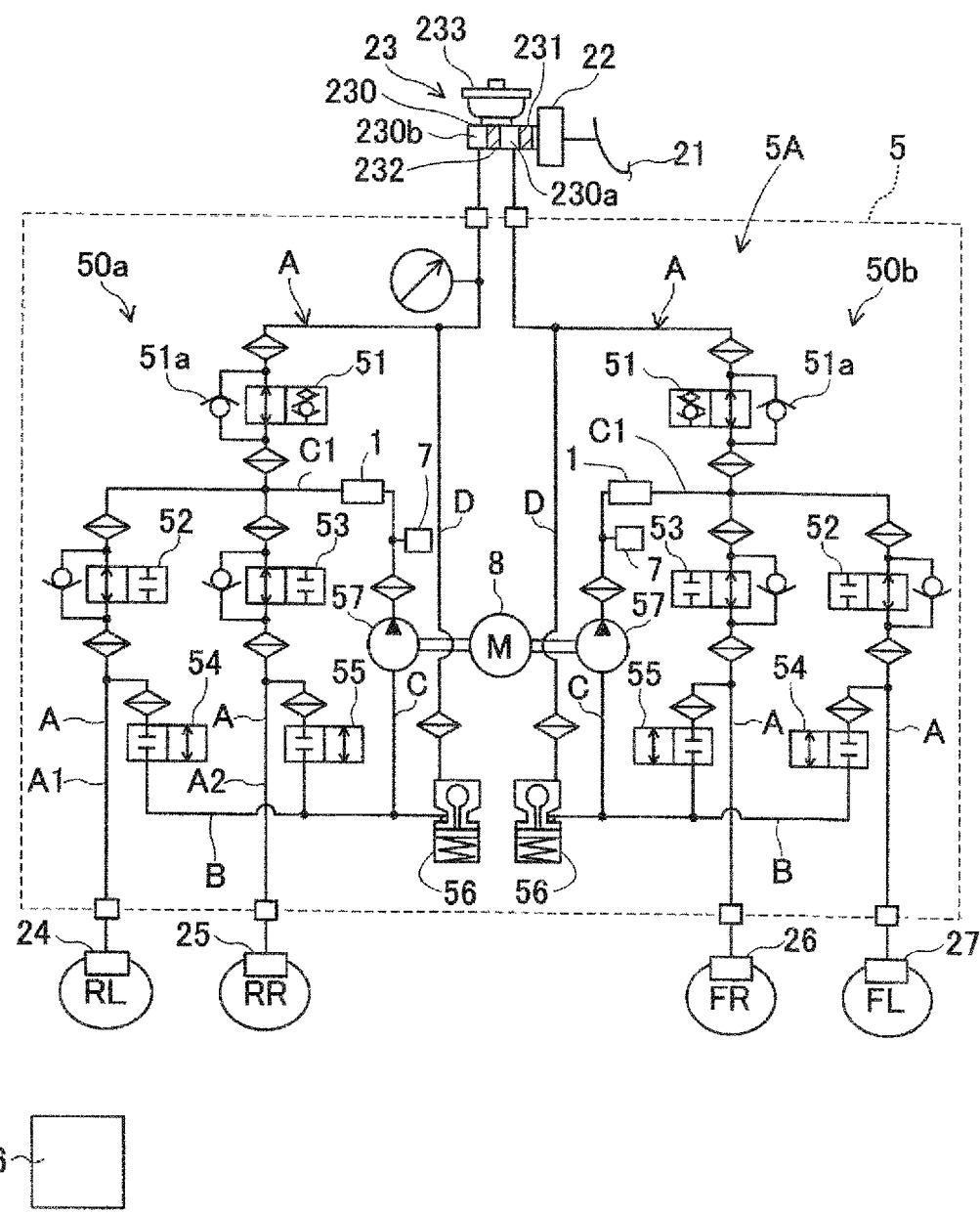
FIG. 17 is a configuration diagram of a hydraulic control device of a brake device.

The actuator 5 is a device that controls the fluid pressure (hereinafter, referred to as a wheel pressure) of the wheel cylinders 24 to 27 according to an instruction from a brake control device 6. Specifically, as shown in FIG. 17, the actuator 5 is provided with a hydraulic circuit 50. The hydraulic circuit 50 includes a first piping system 50a and a second piping system 50b. The first piping system 50a is a system for controlling the fluid pressure (wheel pressure) applied to the left rear wheel RL and the right rear wheel RR. The second piping system 50b is a system for controlling the fluid pressure (wheel pressure) applied to the left front wheel FL and the right front wheel FR. Since the basic constitution of the first piping system 50a and the second piping system 50b are the same, hereinafter, the first piping system 50a will be described, and the description of the second piping system 50b will be omitted.

The first piping system 50a includes a main pipeline A, a differential pressure control valve 51, booster valves 52, 53, a decompression pipeline B, pressure reducing valves 54, 55, a pressure regulating reservoir 56, a reflux pipeline C, and an auxiliary line D, in which these can be controlled by the brake control device 6 to perform, so-called, automatic brake control and anti-skid control. In this case, the electromagnetic valve 10 described in the above-described embodiments and modification examples can be applied to the differential pressure control valve 51, the booster valves 52, 53, and the pressure reducing valves 54, 55, respectively.

In a case where the above-described electromagnetic valve 10 is applied to the differential pressure control valve 51, the booster valves 52, 53, and the pressure reducing valves 54, 55 of the vehicle brake control system, for example, it is conceivable that the number of opening and closing operations of the electromagnetic valve 10 increases with the automatic brake control and anti-skid control. Meanwhile, in the electromagnetic valve 10, as described above, the guide member 16 can align the valving element 15 so that the axis line Jv of the valving element 15 coincides with the axis line Js of the valve seat 14a and guide the valving element 15 to the valve seat 14a in the aligned state.

Accordingly, even if the number of opening and closing operations of the electromagnetic valve 10 increases due to the automatic brake control and the anti-skid control in the vehicle brake control system, since the axis line Jv of the valving element 15 and the axis line Js of the valve seat 14a coincide with each other, the tip portion 15b of the valving element 15 is always seated at a proper position of the valve seat 14a. As a result, for example, it is possible to suppress occurrence of deformation, uneven wear and the like of the tip portion 15b of the valving element 15 and the valve seat 14a, and the durability of the electromagnetic valve 10 can be greatly improved. In addition, it is possible to suppress occurrence of deformation, uneven wear and the like of the tip portion 15b of the valving element 15 and the valve seat 14a, so that the sealing property of the electromagnetic valve 10 can be favorably maintained for a long period of time. Therefore, the electromagnetic valve 10 can exhibit good flow rate characteristics.

The implementation of the present invention is not limited to the above-described embodiments and modification examples, and it is needless to say that various modifications can be made without departing from the object of the present invention.

For example, in each of the above-described embodiments and modification examples, in a case where the valving element 15 is separated from the valve seat 14a with respect to the valve body 13, the outflow hole 13c through which the fluid flowed into the first chamber R1 from the valve hole 14b flows out (is discharged) is provided. In this case, it is possible to provide an inflow hole for allowing the fluid to flow into the first chamber R1 with respect to the valve body 13. In this case, the fluid flows into the first chamber R1 from the inflow hole provided in the valve body 13. Then, in a case where the valving element 15 is separated from the valve seat 14a, the fluid of the first chamber R1 flows out (discharged) through the valve hole 14b. In this case, the guide member 16 can align the valving element 15 without interrupting the flow of the fluid, and can guide the seating or separating valving element 15.

In addition, in each of the above-described embodiments and modification examples, the spring 16d as an elastic member constituting the pushing member is used. In this case, instead of using the spring 16d, for example, a rubber material can be used as an elastic member. In this case, since the guide member 16 is held (fixed) at a proper position by the rubber material, the guide member 16 can align the valving element 15 and can guide the seating or separating valving element 15.

The invention claimed is:

1. An electromagnetic valve comprising: a cylindrical sleeve; a cylindrical valve body fixed to one end of the cylindrical sleeve; a columnar stator fixed to another end of the cylindrical sleeve; a moving part disposed to be slidable along an axis line of the cylindrical sleeve between the columnar stator and the cylindrical valve body inside the cylindrical sleeve; a biasing member that urges the moving part along the axis line of the cylindrical sleeve; a coil that is provided on an outer periphery of the cylindrical sleeve and causes the columnar stator to generate an electromagnetic force against a biasing force generated by the biasing member with respect to at least the moving part by energization; a seat member fixed inside the cylindrical valve body and having a valve seat and a valve hole; a valving element that moves along the axis line of the cylindrical sleeve integrally with the moving part and seats on and separates from the valve seat of the seat member; the cylindrical valve body being provided with a dividing wall that extends toward an inside of the cylindrical valve body and separates a first chamber in which the seat member is provided and a second chamber in which the moving part is provided, a through-hole through which the valving element is inserted into the dividing wall, and an inflow hole through which a fluid flows into the first chamber or an outflow hole through which the fluid flows out from the first chamber, a guide member including a cylindrical main body portion disposed between an outer peripheral surface of the valving element and an inner peripheral surface of the through-hole provided in the dividing wall and having an outer diameter smaller than an inner diameter of the through-hole of the dividing wall to form a gap between the cylindrical main body portion and the inner peripheral surface of the through-hole, an insertion hole which is provided in the cylindrical main body portion and through which the valving element is slidably inserted, and a flange portion provided on one-end side of the cylindrical main body portion, having the outer diameter larger than the inner diameter of the through-hole, and being in contact with the dividing wall; and a pushing member pushing the flange portion toward the dividing wall.

2. The electromagnetic valve according to claim 1, wherein another end side of the cylindrical main body portion of the guide member has a shape in which the outer diameter decreases toward the valve seat and is provided in the first chamber, and wherein the flange portion of the guide member and the pushing member are provided in the second chamber.

3. The electromagnetic valve according to claim 1, wherein the flange portion of the guide member includes a flow path that allows the fluid compressed by the movement of the moving part along the axis line of the cylindrical sleeve to communicate between the second chamber and the first chamber via the gap between an outer peripheral surface of the cylindrical main body portion of the guide member and the inner peripheral surface of the through-hole of the dividing wall.

4. The electromagnetic valve according to claim 1, wherein the pushing member is an elastic member that biases the flange portion toward the dividing wall.

5. The electromagnetic valve according to claim 1, wherein the pushing member is the coil that causes an electromagnetic force that attracts the flange portion toward the dividing wall to be generated in the dividing wall by the energization.

6. The electromagnetic valve according to claim 2, wherein the flange portion of the guide member includes a flow path that allows the fluid compressed by the movement of the moving part along the axis line of the cylindrical sleeve to communicate between the second chamber and the first chamber via the gap between an outer peripheral surface of the cylindrical main body portion of the guide member and the inner peripheral surface of the through-hole of the dividing wall.

7. The electromagnetic valve according to claim 2, wherein the pushing member is an elastic member that biases the flange portion toward the dividing wall.

8. The electromagnetic valve according to claim 3, wherein the pushing member is an elastic member that biases the flange portion toward the dividing wall.

* * * * *